Jan. 10, 1956 W. J. CARTLEDGE 2,730,433
SPRAY MIXER
Filed Nov. 2, 1954 2 Sheets-Sheet 1
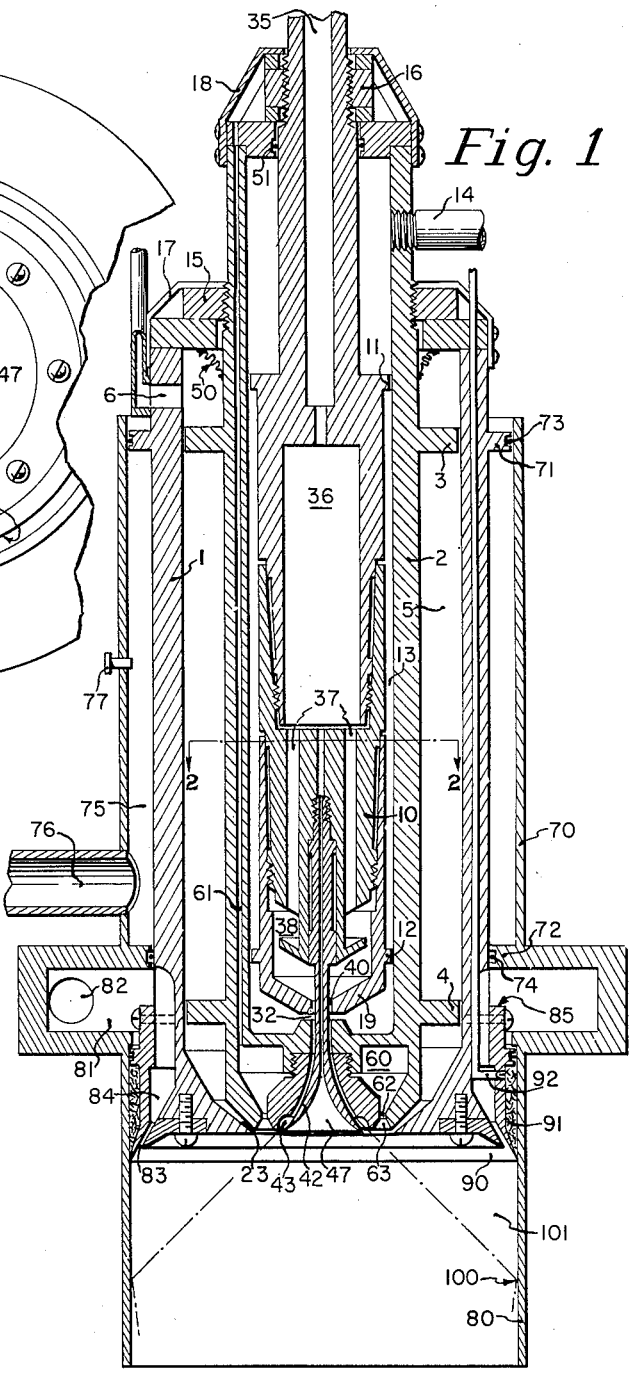
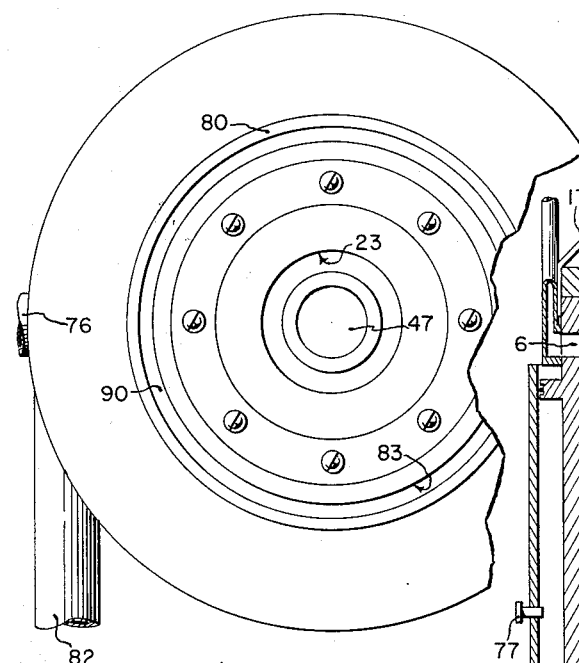
Fig. 3
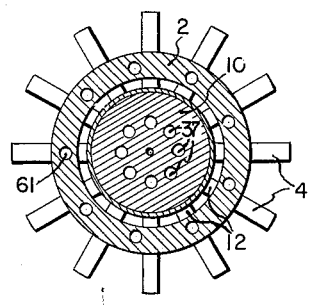
Fig. 2
Fig. 1
INVENTOR
WILLIAM J. CARTLEDGE
BY Cullen D. Frey
ATTORNEY Jan. 10, 1956 W. J. CARTLEDGE 2,730,433
SPRAY MIXER Filed Nov. 2, 1954 2 Sheets-Sheet 2

INVENTOR
WILLIAM J. CARTLEDGE
BY *Cullen G. Frey*
ATTORNEY

United States Patent Office 2,730,433
Patented Jan. 10, 1956

2,730,433

SPRAY MIXER

William J. Cartledge, Wilmington, Del., assignor to E. I. du Pont de Nemours and Company, Wilmington, Del., a corporation of Delaware Application November 2, 1954, Serial No. 466,319

6 Claims. (Cl. 23—285)

This invention relates to improvements in apparatus for preparing resin materials, and more particularly to a spray mixer especially adapted for preparing cellular products such as by the reaction of diisocyanates and compounds containing reactive hydrogen.

Cellular products produced from diisocyanates and compounds containing reactive hydrogen have been found to have a variety of uses such as for insulation, as structural reinforcement, and numerous other uses in which plastic or elastic foamed resins are currently employed. In order to obtain uniform cellular structure, it is essential that the ingredients be intimately and uniformly mixed, and because of the reactivity of the isocyanates employed it is necessary that this mixing be done quickly since the evolution of carbon dioxide which creates the foam is evolved as soon as the reaction starts. Usually it is the reaction of water with the isocyanates that liberates the carbon dioxide to produce the foamed resin.

When mixing is carried out by hand or by mechanical agitators, only relatively small quantities can be mixed at one time if a product of uniform properties is to be obtained. This requires several pours for large cellular structures, and the mixing apparatus, as well as the vessels in which it is mixed, become contaminated with the product in various stages of cure and therefore requires frequent cleaning. While suggestions for continuous mixers have been made, those heretofore disclosed are so constructed that whenever there is an interruption for any reason the reaction mass in the mixing zone continues foaming and curing, so that it is necessary to clean out the mixers, which is a tedious and difficult operation.

It is an object of the present invention to provide a spray mixer in which the reactive materials can be brought into contact to produce uniform foamed resin materials either continually or in small batches, as desired, and one which has a minimum of moving parts and is self-cleaning, thereby obviating the necessity for shut-downs and tedious, expensive operations.

In the accompanying drawing, which forms a part of this application,

Figure 1 is a vertical sectional view of a spray mixer of the present invention;

Figure 2 is a cross-section of the mixer of Figure 1 taken on the line 2—2;

Figure 3 is an end view of the spray mixer looking upward into the mixing chamber.

Figure 4:
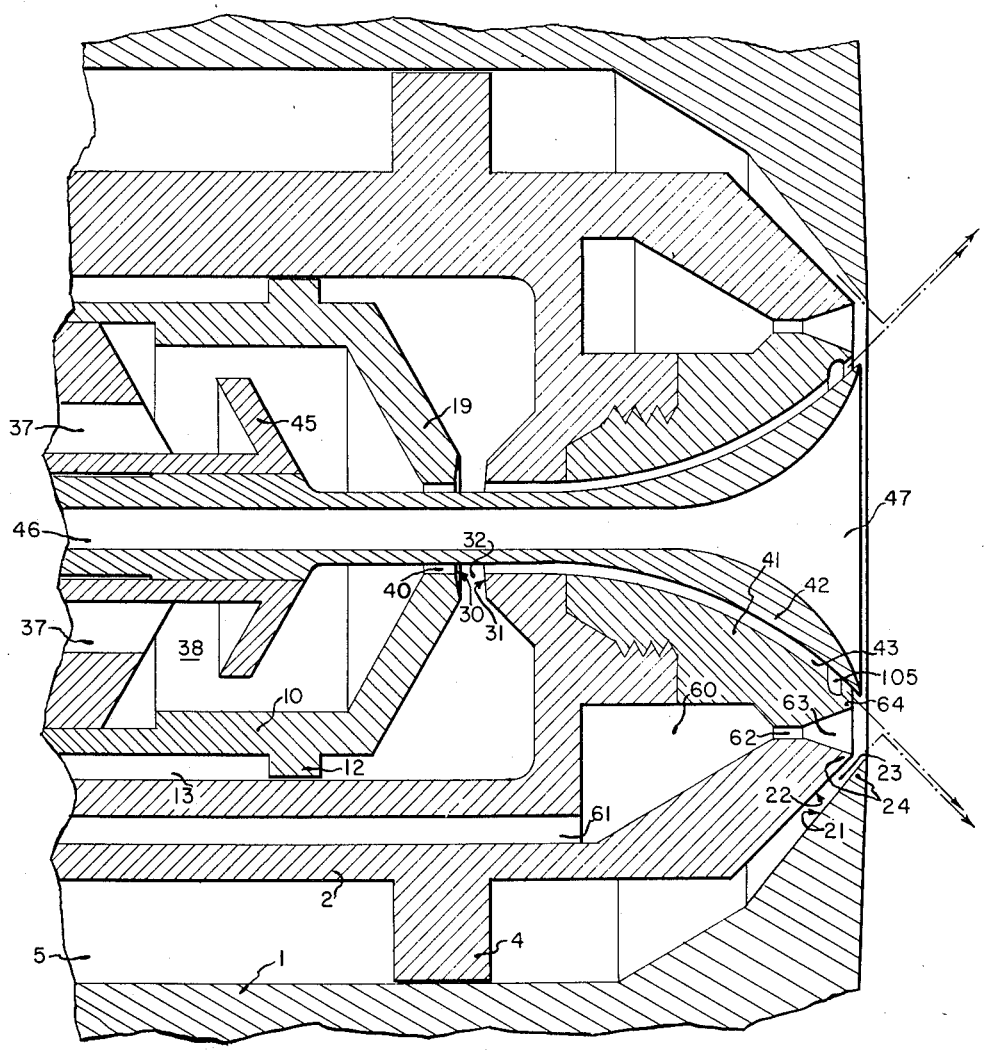
Figure 4 is an enlarged detailed sectional view of the mixing part of the apparatus.

In preparing the isocyanate-resin cellular products for which the apparatus of this invention is especially adapted, an isocyanate containing resinous component is mixed with a component containing a chemical which, when reacted with the isocyanate, produces a foam, and usually a catalyst for the reaction. These materials must be brought together in proper proportions and under conditions which ensure thorough and rapid mixing and release of the resulting mixture under conditions of no stress, or under uniform stress. In the apparatus of the present invention, the mixing is independent of and separated from the feed sources and therefore the reaction can be started and stopped without having an unusable residue left in any portion of the spray mixer.

In preparing the isocyanates resin-foam material the resinous component may first be reacted with an excess of an organic diisocyanate while the foam reactant, such as water and the catalyst, may be prepared as a separate mixture and these two separate mixtures fed through the spray mixer of the present invention together with air as a propellent to produce the desired foamed resin material. In other cases, the water may be incorporated with the resinous component and the isocyanate fed in separately. Various adaptations of the spray mixer of the present invention will be obvious as the description proceeds, it being understood that the apparatus is not limited in its usefulness to any particular reactants but is suitable wherever it is necessary to mix two or more reactants together to form a product which would ordinarily gum up and in a short time would clog the ordinary mixing apparatus, thus necessitating repeated cleanings.

In the accompanying drawing, the spray mixer illustrated is composed of a cylindrical body portion 1 into which is concentrically fitted for longitudinal movement a second hollow cylindrical member 2 which throughout susbtantially its entire length is spaced from the member 1 by lands 3 and 4, forming an annular space 5 between the two members through which liquid material can be fed from the inlet 6. A central cylindrical core or unit 10 is similarly fitted for longitudinal movement within the member 2 and spaced therefrom by means of lands 11 and 12 so as to form an annular space 13 between the two members through which a second fluid material can be fed from the inlet 14. The longitudinal movement between the body 1 and member 2, and between the member 2 and the core 10, is controlled in each case by knurled nuts 15 and 16 operating within yokes 17 and 18, respectively.

Referring to the enlarged detailed view of Figure 4, the lower end of the member 1 has a conically shaped inner wall 21 providing a cylindrical opening, and the lower end of the cylindrical member 2 has an external conical face 22 which fits within the conical opening or wall 21 to provide a narrow passage 23 which may be opened and closed as desired by moving the parts 1 and 2 relative to each other. The faces 21 and 22 are not parallel but are at a slight angle to each other so that when closed by moving the members 1 and 2 longitudinally the outer edges at 24 are the first to contact and shut off the flow of material which flows through the conical passage 23.

The core member 10 and the cylindrical member 2 are also provided with cooperating faces 30 and 31 at their lower ends which can be moved together or apart to form a closure or opening 32 as the members are adjusted relative to each other by tthe knurled nut 16 (Figure 1). The narrow faces 30 and 31 are parallel and inclined upward (about 5°) from the horizontal.

This feature is important for two reasons; first, because generally horizontal orifice arrangement reduces the sensitivity to machine tolerance and improves on orifice dimensional accuracy, and secondly, a slight upper inclination results in liquid opposing rather than paralleling the air flow. This prevents a siphoning effect on the liquid that passes out of the opening 32 by the high velocity air stream which would otherwise destroy accuracy of proportioning control. This results in a finer particled size atomization through shear versus tensile operation of the air on the liquid surface.

The cylindrical body portion 1, the hollow cylindrical member 2 and the center core or unit 10 are carefully fitted to insure evenness of the orifice openings 23 and 32 between the faces 21 and 22 and between the faces 30 and 31, thus providing uniform delivery of the materials being fed through these openings and positive and complete liquid shut-off when the faces are moved together.

The central core member 10 is provided with a central bore 35 (Figure 1) which opens into a larger bore or chamber 36 from which a series of passages 37 lead to a space or reservoir 38 from which air may be fed through an annular passage 40 and directed past the opening 32. The cylindrical member 2 and core member 10 are provided with nozzle parts 41 and 42 (Figure 4) which cooperate to provide a bell-shaped passage 43 through which the air from the passage 40 is directed outwardly at approximately a right angle to the direction of flow of material that is fed from the conical passage 23. The reservoir 38 is provided with a baffle 45 to insure uniform pressure and sectional velocity of the air mass within the reservoir so that uniform and equal quantities of air are forced through all portions of the annular opening 40 and the air nozzle 43. The nozzle piece 42 is provided with an axially arranged passage 46 which terminates in the bell-shaped opening 47 through which air is led from the air chamber 36.

As shown in Figure 1 of the drawing, the central core 10 is made up of several pieces threaded together so that the necessary air ducts and chambers can be provided, the nozzle piece 42 and end member 19 being carefully fitted to provide the annular air passage 40.

A liquid seal 50 is provided between the upper ends of the members 1 and 2. Suitable sealing means, such as at 51, are also provided between the cylindrical member 2 and the core member 10.

The lower end of the cylindrical member 2 is provided with a "leveling" or "flow smoothing" air reservoir 60 through which air is supplied at atmospheric pressure through passages 61 in the member 2. An uninterrupted air passage 62 connects the reservoir with the lower end of the spray mixer and exits between the nozzle openings 23 and 43 in an enlarged opening 63, the purpose for this being described in detail in connection with the operation of the mixer.

Encasing the cylindrical body portion 1 is a longitudinally movable tubular member 70 which is spaced from the cylindrical body portion 1 by an annular flange 71 integral with the member 1, and an internal flange 72 integral with the member 70. Suitable sealing rings 73 and 74 are provided to maintain an air-tight or liquid-tight chamber 75 with an inlet at 76. The lower end of the member 70 constitutes a target cylinder 80 against which the materials to be mixed impinge and flow downwardly from the end of the mixer. To aid in cleaning the target cylinder, an air chamber 81 with inlet 82 is provided in the tubular member 70 from which air is allowed to flow through the passage 84 and conical outlet 83 against the inner wall of the target cylinder 80. The air in the air chamber 81 operating against the fixed portions 85 on the body member 1 moves the tubular member 70 upward while air or other liquid introduced into the chamber 75 forces it downward again into its operating position, the upward movement being limited by a stop such as 77 which contacts the flange 71. A circular knife-edge member 90 of spring steel is provided on the member 1 which bears against the inner surface of the target cylinder 80 so that, as the target cylinder is moved upwardly, all material adhering to the inner surface is scraped away, with the blast of air from outlet 83 operating to remove the loosened material. A packing 91 is provided which may be supplied with a solvent for the resin through the duct 92, thereby aiding in the cleaning of the target cylinder.

The operation of the jet mixer of this invention can best be illustrated by a specific example in which the components used in making diisocyanate cellular products are employed. The following example is given to illustrate the preparation of this composition.

*Example*

Into an agitated vessel there is placed 50 parts of 2,4-tolylene diisocyanate and the temperature is adjusted to from 25° to 35° C. Then 42.5 parts of castor oil are added slowly. The temperature rises due to heat of reaction. Cooling water is circulated in the jacket and the rate of addition is controlled so that the temperature does not rise above 100° C. After the castor oil has been added, 7.5 parts of polyethylene ether glycol of average molecular weight 200 is added gradually, the temperature being held between 100° to 110° C. by cooling and regulating the rate of addition. The mass is then stirred at from 98° to 102° C. for one hour, cooled, and discharged into containers. The resin component thus prepared is a clear, light yellow liquid, viscosity at 73° F. of about 25,000 centipoises. It of course possesses unreacted isocyanate groups.

The water-catalyst component is prepared by mixing in an agitated and cooled vessel 42.1 parts of diethylethanolamine and 33.9 parts of distilled water; then there is added gradually 24 parts of 36.5% hydrochloric acid, the temperature being held below 40° C. After stirring an additional 15 minutes, the solution is discharged into containers. The catalyst solution has a pH of 9.8.

This two component composition is, or other two component mixtures are, employed in the mixer of the present invention in the following manner. The resin component is heated to about 80° C. to reduce its viscosity and is fed to the mixer by means of a positive displacement pump at a rate of 1920 parts by weight per minute while the aqueous catalyst component is fed at a rate of 125.6 parts per minute. Air is fed to the mixer at an inlet pressure of 120 pounds per square inch. The aqueous catalyst air spray forms the inner cone which picks up the resin component from the outer cone and impinges against the walls of the mixer surface. The mixture begins to foam as it runs down the surface. It is collected in a square box with a polyethylene film liner or other device as desired. The flow from the mixer is shut off. The mass foams up and fills the container and after about one hour it has cured to a strong, somewhat flexible cellular mass of uniform pore structure. The foam is removed from the container and the polyethylene film is stripped off. The density is approximately 2 pounds per cubic foot. It can be cut or sawed to shape it for use as insulation for various objects.

The principal characteristics of the apparatus of this invention are that a hollow cone-shaped air spray of aqueous catalyst solution is ejected at relatively high velocity from the circular nozzle orifice 43, while the resin component is forced under pressure from a second circular orifice 23 in the form of a thin-walled inverted cone. This inverted cone of the resinous component intersects the cone of air catalyst solution which is traveling with a greater force and is carried along with it to the inner surface of the target cylinder 80. In this travel and due to impinging of stream on stream and finally of both streams on the target cylinder 80, the kinetic energies of the two moving streams assures a thorough and uniform mixing of the two components. The cylinder 80 is disposed essentially vertically so that the mixing zone is open at the bottom. As the mass impinges on this surface, kinetic energy is dissipated and it flows downwardly by gravity into any desired receiver or on to the work to be coated or filled. There are thus no disruptive forces to break the forming cell walls of the cellular plastic material.

The circular orifices through which the components are forced may be opened and closed manually as indicated on the drawing, or by automatic means. When both orifices are closed, there is no cavity within the jet mixer in which the material may remain, and therefore no heels to harden and cause stoppage of the passages.

When the flow of the reactants is shut off there remains a small amount of material on the surface surrounding the mixing space which, if allowed to stand, will expand and cure into a foamed resin. This can be effectively removed by moving the tubular member 70 upward by injecting air into the chamber 81, and the knife blade 90 pressing against the inner surfaces of the target cylinder 80 scrapes off any remaining resin, while the solvent in the packing 91 washes the surface clean. At the same time, a blast of air through the passage 83 passes over the knife edge 90 to assist in removing material that is scraped loose. The solvent saturated packing 91 both keeps the knife blade moistened with solvent and wipes the surface of the target cylinder 80 as it passes. When the target cylinder is returned to its original position, the apparatus is ready to be used in the formation of cellular material without further delay. The shut-down and cleaning, therefore, require only a few seconds.

The resin component is usually rather viscous and it may require warming to decrease the viscosity for proper flow through the apparatus. Preheating to a temperature of from 60° to 80° C. is usually permissible. The resin component is fed through the apparatus in the chamber 5 while the aqueous catalyst is fed through the cylindrical chamber 13. The air is fed through the channels 37 and chamber 38 in the core member. The compressed air used may be cooled and dried before passing into the apparatus, to prevent the condensation of moisture normally present in the air. On release of the air at the orifice 43, there will be some cooling effect. Some heat is evolved during the foaming due to the chemical reaction between the isocyanate and the water or other carbon dioxide generating component. The cool air flow helps dissipate this heat. This lessens the tendency of the freshly formed foam to shrink on curing and cooling. Drying of the air is desirable when the amount of water added to the resin isocyanate component is critical.

The liquid resinous component and the liquid catalyst component are delivered to the mixer by separate equipment outside the scope of this invention through passages or hose lines connected at 6 and 14, respectively. Arrangement of the separate proportioning equipment is such as to assure that a steady flow in proper proportions is supplied to the mixer.

Ordinarily, the adjustment between the body member 1 and cylindrical member 2 by means of the knurled nut 15 will be sufficient to permit approximately 1/16" vertical movement. Since the valve opening 23 is closed first at the tips 24, the resin fed can be shut off without the formation of a "heel." Usually this valve will be closed simultaneously with the closure of the valve at 32.

The movement of the cylindrical core member 10 within the cylindrical member 2 is controlled by the knurled nut 16 which should permit at least 1/16" movement from the fully closed to fully opened position.

The atomizing air which is fed into the jet mixer through the bore 35 may be heated or cooled as desired, and, if necessary, dehumidified as pointed out above. The air flow is coincident with the mixer center line until it reaches the nine passages 37 where it is divided into separated, but equal, volume streams passing into the chamber 38 and around the deflector 45. The deflector is necessary to blend the separate streams of the air and provide a pressure and sectional velocity of the air mass within the outer portion of the reservoir 38 so that the air is ejected in uniform and equal quantities through all portions of the air passage 40. This is essential in the proper atomization of the aqueous catalyst which is ejected from the nozzle.

Atomization of the aqueous catalyst is accomplished evenly around the periphery of the air nozzle at the point of intersection of the air with the aqueous catalyst which flows from the opening 32. Closing of the valve or opening 32 of course shuts off the liquid available for atomization cleanly and without "heels" at this point.

Atomized catalyst flowing at high velocity in a cylindrical pattern is shaped into a hollow cone by the nozzle parts 41 and 42. The atomized catalyst thus leaves the flow channel in the form of an upright thin walled hollow cone which intersects the resin cone only a short distance from the resin outlet 23. The finely divided catalyst particles supported and propelled by the high velocity air permeate the liquid resin mass and become dispersed with the resin and air at this point. The force of the air blast over that of the resin stream results in the resin-air-catalyst mixture being diverted outwardly against the target cylinder 80 at a point which we will refer to as 100. The angular impact against the surface at 100 removes kinetic energy. Additional mixing and agitation is accomplished in the target cylinder by virtue of escapement of propelling air. After being condensed and mixed on the walls of the target cylinder, the components are propelled by gravity and air while restrained to some extent by the surface friction, and fall from the mixer into the desired receiver at medium or low velocity.

In the process of flowing through channel 43, a portion of the atomized catalyst condenses on the walls of the channel. The condensed particles knit into a liquid film which is pushed along the surface of the channel by the frictional force of the air toward the bottom of the channel. Upon reaching the bottom of the channel, surface tension tends to hold a portion of this film of liquid to the metal instead of permitting it to leave the channel, with the result that the film is pushed across the under-surface of the mixer where it intersects the resin stream and tends to react with the resin on the under-surface. This interfacing of components on a surface not readily cleanable causes difficulty in that adhesion, expansion and solidification of resin occurs to interfere with flow patterns. Employment of sharp relief angles to combat catalyst sheeting at this point creates an annular void occupied by stagnant air. Operation of air and liquid jets on two sides of this void tend to evacuate the void, thus creating a partial vacuum in the void. Particles of atomized catalyst from the air jet are then drawn into the void to relieve the vacuum. These particles condense onto surfaces of the void and interface with the resin creating the same undesirable results. To eliminate these results, the following perfections in the structure, as shown enlarged in Figure 4, have been made:

(a) A small annular recess 105 has been designed into the walls of the passageway 43 near its lower extremity. The purpose of this recess is to create a partial vacuum near the surface of the passageway at this point. The downward moving film of condensed catalyst enters the recess and is prevented from passing through it by the force of the partial vacuum. The film, fed by newly condensed catalyst from above, increases in thickness inside the recess until the outward pull of the force of the vacuum is sufficient to overcome the liquid-to-liquid adhesion. Small portions of the thickened film are then pulled into the air stream forming one wall of the recess where they are reatomized and propelled out of the channel. This reatomizing function serves the purpose of reducing the area of the surfaces causing condensation by some 90%, leaving only the smaller area below the recess to create condensation and liquid catalyst film.

(b) A "leveling" or "flow-smoothing" air reservoir is provided at 60, as explained above, and connected to the outside air by means of air passages 61. An uninterrupted annular air passageway 62 connects the reservoir with the annular void 63 with sharp relief angles. Creation of the sharp "annular point" at the discharge edge 64 of the catalyst passageway accumulates the remaining catalyst film on the point. The venturi effect of the catalyst air jet acting on the air inside the annular recess 63 tends to create a partial vacuum inside this recess. Air from the air reservoir is drawn into the recess through the annular passageway to relieve the vacuum tendency.

Fresh outside air is, in turn, drawn through the passages to replenish the air reservoir 60. Thus, operation of the pressure catalyst air jet creates a constant flow of low pressure air from outside the mixer through the reservoir 60 and through the recess or void 63 where it joins the air jet and is expelled with the pressurized jet. The catalyst film tending to accumulate on the point is, therefore, acted upon on both sides of the point by converging air streams. Thus, the film is prevented from further sheeting by being pushed toward the point where it is reatomized into the catalyst air jet before crossing the void and interfacing with resin on a surface.

(c) To further discourage catalyst film sheeting (by making "climbing" of the catalyst film in the face of the opposing air stream more difficult), the portion of the passageway wall at 64 comprising the annular "point" has been formed of a material such as "Teflon" (polymerized tetrafluoro ethylene), having a low surface adhesion affinity to liquid catalyst.

Since the triangular-shaped annular void 101 (Figure 1) is occupied by stagnant air and since this void is subjected on one side to a jet of air and liquid components, tendency toward a partial vacuum within the void is created. This tendency, unless removed, causes particles of resin and catalyst compounds to be drawn into the void. These components condense on surfaces bounding the void, react and interfere with proper operation of the mixer. Clean, low pressure air is therefore brought in through annular channel 83 from an outside source, as described above, during operation of the unit. This gentle sweep of air serves two purposes, i. e.: (1) it replenishes the air withdrawn by the principal component jet, thus relieving vacuum tendency within the void tending to cause liquid particle draw-in, and (2) it blankets or shields upper target cylinder walls from effects of "splash" of stray liquid particle flow outside the impact area on the target cylinder.

As described above, the nozzle part 42 is formed with a bell shaped outlet 47 through which air is led from the air reservoir 46 to permit air to flow to the under side of the cone, which eliminates the tendency to form a vacuum in that space which would otherwise be caused by entrainment of air in the spray cone. While this refinement for releasing the vacuum in the central portion of the mixer is not absolutely essential, it aids in the successful operation of the apparatus.

While movement of the target cylinder 80 for the purpose of cleaning the under surface along the knife edge 90 is illustrated as being effected by means of air or other liquid, it will be recognized that the movement of this cylinder may be effected by any suitable means. It is preferred that the taregt cylinder motivation and control be interlocked with the mixer valve operation in a manner making the cleaning operation mandatory whenever the valve is closed.

Ordinarily upon completion of the upward movement of the target cylinder due to air flow into the chamber 82, the air flow is diverted from that channel into the channel 75 by means of selector valves, not shown, thus forcing the target cylinder downward again into operating position.

It will be obvious from the above description that various modifications and changes may be made in the detailed structure, all within the scope of the present invention as more particularly defined in the appended claims.

I claim:

1. A spray mixer comprising a body provided with two separate inlets for materials to be mixed and an inlet for a gaseous material to be used as a propellant and atomizer for one of the liquids, concentrically arranged annular outlet orifices for said liquids, the walls of the outer annular orifice being shaped to project the liquid downwardly therefrom in the form of a thin-walled inverted cone, while the walls of the inner annular orifice are shaped to project the material downwardly in the form of a thin-walled upright cone which intersects the line of projection from the outer orifice; means within the mixer for feeding a gaseous propellant and atomizer into the path of flow of liquid to be ejected from the inner orifice whereby the liquid from the inner orifice may be propelled at a substantially higher velocity than the liquid projected from the outer orifice, and annular means extending downwardly from said body against which the materials projected from the orifices may impinge as they flow from said mixer.

2. A spray mixer comprising a vertically extending hollow cylindrical body member; a second cylindrical member vertically movable in the hollow member and jointly forming therewith a passage into which a liquid material may be fed, the said second member being hollow and having a core member fitted therein for longitudinal movement, said second member and core member jointly forming a second passage into which a second liquid may be fed, said body member being provided at its lower end with a conical opening and said second member being provided at its lower end with a conical face fitting into the conical opening of the body member to form an annular orifice through which a liquid will be projected downwardly therefrom in the form of a thin-walled inverted cone; nozzle members on the lower end of the core providing an annular orifice, the walls of which are shaped to project the second material downwardly therefrom in the form of a thin upright cone, said annular orifices being concentrically arranged so that the liquid projected from the inner orifice intersects the line of projection from the outer orifice, said core being provided with an air passage through which air is fed to the orifice in the nozzle members, the lower outer face of the core member and the lower inner face of the second member being provided with cooperating portions which form a closure when moved longitudinally relative to each other and when moved apart form an orifice opening into the nozzle orifice; means sealing the upper ends of the body member and cylindrical member to provide a liquid-tight chamber and means sealing the upper ends of the second member and the core member to provide a second liquid-tight chamber; and means for effecting movement of each of the members relative to each other for opening and closing the orifices.

3. The spray mixer of claim 2 in which the angle of the conical opening in the body member and the conical face in the second member are such that only the outer tips of the two orifices contact to form a closure when the members are moved longitudinally into closed position.

4. The spray mixer of claim 2 in which the closure at the lower end of the second cylindrical member and the core comprises cooperating faces in a plane substantially at right angles to the air passage in the nozzle members.

5. The spray mixer of claim 2, provided with an air outlet in its lower face between the concentrically arranged annular orifices from which the two liquids are ejected to prevent accumulation of materials on the nozzle face.

6. The spray mixer of claim 2 provided with an annular member extending downwardly from said body member against which the materials projected from the orifices may impinge as they flow from said mixer; means on said body member closely fitting against the inner wall of said annular member; and means for moving said annular member longitudinally with the body member to effect cleaning thereof.

References Cited in the file of this patent

UNITED STATES PATENTS

| | | |
|---|---|---|
| 2,072,375 | McCallum | Mar. 2, 1937 |
| 2,645,527 | Walters | July 14, 1952 |